(12) United States Patent
Gossett et al.

(10) Patent No.: US 8,385,470 B2
(45) Date of Patent: Feb. 26, 2013

(54) CODING A SIGNAL WITH A SHUFFLED-HADAMARD FUNCTION

(75) Inventors: Carroll Philip Gossett, Mountain View, CA (US); Michial Allen Gunter, Oakland, CA (US)

(73) Assignee: Google Inc., Mountain View, CA (US)

(*) Notice: Subject to any disclaimer, the term of this patent is extended or adjusted under 35 U.S.C. 154(b) by 1035 days.

(21) Appl. No.: 12/356,791

(22) Filed: Jan. 21, 2009

(65) Prior Publication Data

US 2009/0185629 A1 Jul. 23, 2009

Related U.S. Application Data

(63) Continuation-in-part of application No. 10/943,677, filed on Sep. 16, 2004, now abandoned, which is a continuation of application No. 09/730,697, filed on Dec. 5, 2000, now Pat. No. 6,829,289, which is a continuation-in-part of application No. 10/402,878, filed on Mar. 28, 2003, now Pat. No. 7,545,849.

(51) Int. Cl.
*H03K 9/00* (2006.01)
*H04L 27/00* (2006.01)

(52) U.S. Cl. ........ 375/316; 375/141; 375/145; 375/146; 375/149; 370/209

(58) Field of Classification Search .................. 375/316, 375/141, 145, 146, 149; 370/209
See application file for complete search history.

(56) References Cited

U.S. PATENT DOCUMENTS

| | | | |
|---|---|---|---|
| 4,358,844 A | 11/1982 | Pirani | |
| 4,558,302 A | 12/1985 | Welch | |
| 4,578,676 A | 3/1986 | Harrison | |
| 5,136,375 A | 8/1992 | Citta et al. | |
| 5,268,927 A | 12/1993 | Dimos et al. | |
| 5,278,871 A * | 1/1994 | Rasky et al. | 375/343 |
| 5,410,568 A | 4/1995 | Schilling | |
| 5,515,396 A | 5/1996 | Dalekotzin | |
| 5,623,485 A | 4/1997 | Bi | |
| 5,646,964 A | 7/1997 | Ushirokawa et al. | |
| 5,649,299 A | 7/1997 | Battin et al. | |
| 5,677,929 A | 10/1997 | Asano et al. | |
| 5,687,191 A | 11/1997 | Lee et al. | |
| 5,691,974 A | 11/1997 | Zehavi et al. | |

(Continued)

FOREIGN PATENT DOCUMENTS

| | | |
|---|---|---|
| CN | 1732634 A | 2/2006 |
| CN | 1301090 C | 2/2007 |

(Continued)

OTHER PUBLICATIONS

Chinese Office Action with English language translation issued Jul. 3, 2009 in Chinese Patent Application No. 200380107932.6, 4 pages.

(Continued)

*Primary Examiner* — Shuwang Liu
*Assistant Examiner* — Nader Bolourchi
(74) *Attorney, Agent, or Firm* — Fish & Richardson P.C.

(57) ABSTRACT

A method can include receiving, at an electronic transmitter device, for communication to an electronic receiver device, a first data value corresponding to one of a plurality of predetermined data values; identifying, from a matrix of data bits having the form of a $2^N \times 2^N$ Hadamard matrix whose rows have been randomly or pseudo-randomly shuffled, a column of data bits that is associated with the first data value; and transmitting to the electronic receiver device, in place of the first data value, the identified column of data bits. The method can further include receiving data at the electronic receiver; correlating the received data to the identified column of data bits; and providing the first data value for further processing by the electronic receiver.

26 Claims, 5 Drawing Sheets

U.S. PATENT DOCUMENTS

| | | | |
|---|---|---|---|
| 5,715,236 A | 2/1998 | Gilhousen et al. | |
| 5,729,465 A | 3/1998 | Barbaresco | |
| 5,742,694 A | 4/1998 | Eatwell | |
| 5,809,060 A * | 9/1998 | Cafarella et al. | 375/146 |
| 5,809,061 A | 9/1998 | Shea et al. | |
| 5,822,360 A | 10/1998 | Lee et al. | |
| 5,825,807 A | 10/1998 | Kumar | |
| 5,864,548 A | 1/1999 | Liu | |
| 5,872,540 A | 2/1999 | Casabona et al. | |
| 5,940,429 A | 8/1999 | Lam et al. | |
| 5,940,791 A | 8/1999 | Byrnes et al. | |
| 5,943,421 A | 8/1999 | Grabon | |
| 5,995,923 A | 11/1999 | Mermelstein et al. | |
| 6,005,891 A | 12/1999 | Chadwick et al. | |
| 6,009,118 A | 12/1999 | Tiemann et al. | |
| 6,009,129 A | 12/1999 | Kenney et al. | |
| 6,011,789 A | 1/2000 | Schilling | |
| 6,040,864 A * | 3/2000 | Etoh | 375/240.16 |
| 6,072,822 A | 6/2000 | Naruse et al. | |
| 6,091,725 A | 7/2000 | Cheriton et al. | |
| 6,091,760 A | 7/2000 | Giallorenzi et al. | |
| 6,125,378 A | 9/2000 | Barbano | |
| 6,128,332 A | 10/2000 | Fukawa et al. | |
| 6,169,912 B1 | 1/2001 | Zuckerman | |
| 6,173,331 B1 | 1/2001 | Shimonishi | |
| 6,185,246 B1 | 2/2001 | Gilhousen | |
| 6,185,426 B1 | 2/2001 | Alperovich et al. | |
| 6,211,828 B1 | 4/2001 | Krylov et al. | |
| 6,229,478 B1 | 5/2001 | Biacs et al. | |
| 6,249,760 B1 | 6/2001 | Bossemeyer | |
| 6,256,609 B1 | 7/2001 | Byrnes et al. | |
| 6,330,291 B1 * | 12/2001 | Agrawal et al. | 375/326 |
| 6,359,875 B1 | 3/2002 | Hamada et al. | |
| 6,370,183 B1 | 4/2002 | Newson et al. | |
| 6,393,047 B1 | 5/2002 | Popovic | |
| 6,411,645 B1 | 6/2002 | Lee et al. | |
| 6,418,147 B1 | 7/2002 | Wiedeman | |
| 6,426,977 B1 | 7/2002 | Lee et al. | |
| 6,449,305 B1 | 9/2002 | Menich et al. | |
| 6,463,089 B1 | 10/2002 | Chauncey et al. | |
| 6,496,474 B1 | 12/2002 | Nagatani et al. | |
| 6,501,733 B1 | 12/2002 | Falco et al. | |
| 6,507,573 B1 | 1/2003 | Brandt et al. | |
| 6,522,656 B1 | 2/2003 | Gridley | |
| 6,526,091 B1 * | 2/2003 | Nystrom et al. | 375/142 |
| 6,535,544 B1 | 3/2003 | Partyka | |
| 6,545,975 B1 | 4/2003 | Giardina et al. | |
| 6,560,445 B1 | 5/2003 | Fette et al. | |
| 6,563,793 B1 | 5/2003 | Golden et al. | |
| 6,611,519 B1 | 8/2003 | Howe | |
| 6,611,600 B1 | 8/2003 | Leber et al. | |
| 6,621,796 B1 | 9/2003 | Miklós | |
| 6,640,209 B1 | 10/2003 | Das | |
| 6,657,986 B1 | 12/2003 | Laudel et al. | |
| 6,665,825 B1 | 12/2003 | Mobin et al. | |
| 6,675,125 B2 | 1/2004 | Bizjak | |
| 6,678,341 B1 | 1/2004 | Miyake et al. | |
| 6,691,092 B1 | 2/2004 | Udaya et al. | |
| 6,754,282 B1 | 6/2004 | Ross et al. | |
| 6,807,161 B2 | 10/2004 | Bender et al. | |
| 6,826,241 B2 | 11/2004 | Kahana | |
| 6,829,289 B1 | 12/2004 | Gossett et al. | |
| 6,970,681 B2 | 11/2005 | Darabi et al. | |
| 6,982,945 B1 | 1/2006 | Gossett | |
| 7,016,398 B2 | 3/2006 | Bradley | |
| 7,050,545 B2 | 5/2006 | Tanrikulu et al. | |
| 7,103,026 B2 | 9/2006 | Hall et al. | |
| 7,106,782 B2 | 9/2006 | Howard et al. | |
| 7,142,536 B1 | 11/2006 | Gossett et al. | |
| 7,174,356 B2 | 2/2007 | Agami et al. | |
| 7,352,833 B2 | 4/2008 | Gossett et al. | |
| 7,453,921 B1 | 11/2008 | Gossett | |
| 7,545,849 B1 | 6/2009 | Gunter | |
| 7,551,664 B2 | 6/2009 | Zhang et al. | |
| 7,733,943 B2 | 6/2010 | Gossett et al. | |
| 2001/0033616 A1 | 10/2001 | Rijnberg et al. | |
| 2002/0015388 A1 | 2/2002 | Kim et al. | |
| 2002/0106004 A1 | 8/2002 | Tan | |
| 2002/0118728 A1 | 8/2002 | Mohseni et al. | |
| 2002/0172180 A1 | 11/2002 | Hall et al. | |
| 2002/0191566 A1 | 12/2002 | Fogel | |
| 2003/0009325 A1 | 1/2003 | Kirchherr et al. | |
| 2003/0039222 A1 | 2/2003 | Bae et al. | |
| 2003/0123525 A1 | 7/2003 | Smee et al. | |
| 2003/0138031 A1 | 7/2003 | Okubo et al. | |
| 2003/0161339 A1 | 8/2003 | Oishi et al. | |
| 2003/0185286 A1 | 10/2003 | Yuen | |
| 2004/0095990 A1 | 5/2004 | Gossett et al. | |
| 2004/0228389 A1 | 11/2004 | Odenwalder | |
| 2004/0267860 A1 | 12/2004 | Agami et al. | |
| 2005/0047482 A1 | 3/2005 | Gossett et al. | |
| 2005/0063327 A1 | 3/2005 | Krauss et al. | |
| 2006/0062283 A1 | 3/2006 | Zhang et al. | |
| 2006/0062284 A1 | 3/2006 | Li et al. | |
| 2006/0109897 A1 | 5/2006 | Guo et al. | |
| 2006/0146876 A1 | 7/2006 | Kim et al. | |
| 2006/0159160 A1 | 7/2006 | Kim et al. | |
| 2006/0251261 A1 | 11/2006 | Christoph | |
| 2007/0019644 A1 | 1/2007 | Lee | |
| 2007/0070952 A1 | 3/2007 | Yoon et al. | |
| 2007/0086540 A1 | 4/2007 | Chae et al. | |
| 2007/0147439 A1 | 6/2007 | Rhee et al. | |
| 2007/0211766 A1 | 9/2007 | Horikoshi | |
| 2008/0037673 A1 | 2/2008 | Ahn et al. | |
| 2009/0185629 A1 | 7/2009 | Gossett et al. | |
| 2009/0304048 A1 | 12/2009 | Gunter | |
| 2010/0146229 A1 | 6/2010 | Yang et al. | |
| 2010/0240382 A1 | 9/2010 | Sampath et al. | |

FOREIGN PATENT DOCUMENTS

| | | |
|---|---|---|
| EP | 588598 A1 | 3/1994 |
| EP | 1047215 A3 | 11/2003 |
| EP | 940947 A4 | 8/2005 |
| GB | 2022954 B | 4/1982 |
| GB | 2276794 A | 10/1994 |
| WO | WO0001091 A9 | 1/2000 |
| WO | WO0001092 A1 | 1/2000 |
| WO | WO0011838 A1 | 3/2000 |
| WO | WO0247301 A3 | 6/2002 |
| WO | WO02060081 A2 | 8/2002 |
| WO | WO02065714 A2 | 8/2002 |
| WO | WO03055092 A1 | 7/2003 |
| WO | WO2004047329 A1 | 6/2004 |

OTHER PUBLICATIONS

Chinese Notice of Allowance with English language translation issued Nov. 20, 2009 in Chinese Patent Application No. 200380107932.6, 4 pages.

Chinese Office Action with English language translation issued Apr. 13, 2011 in Chinese Patent Application No. 201010114392.6, 15 pages.

Chinese Office Action with English language translation issued Mar. 12, 2012 in Chinese Patent Application No. 201010114392.6, 33 pages.

Chinese Notice of Allowance with English language translation issued Jul. 4, 2012 in Chinese Patent Application No. 201010114392.6, 4 pages.

Office Action issued in U.S. Appl. No. 12/481,479 on Apr. 13, 2012, 24 pages.

Office Action issued in U.S. Appl. No. 12/481,479 on Jun. 20, 2012, 11 pages.

PCT International Search Report issued in PCT International Application No. PCT/US2001/046371 dated Dec. 17, 2002, 3 pages.

PCT International Search Report issued in PCT International Application No. PCT/US2001/047553 dated Feb. 6, 2003, 6 pages.

PCT International Search Report issued in PCT International Application No. PCT/US2002/000124 dated Oct. 4, 2002, 2 pages.

PCT International Search Report issued in PCT International Application No. PCT/US2002/039663 dated Apr. 11, 2003, 2 pages.

PCT International Search Report issued in PCT International Application No. PCT/US2003/036607 dated May 12, 2004, 3 pages.

PCT International Preliminary Report on Patentability issued in PCT International Application No. PCT/US2010/020606 dated Aug. 4, 2011, 8 pages.

Bernardini A. et al. Linear Prediction Methods for Interference Elimination in Spread Spectrum Systems, European Transaction on Telecommunications and Related Technologies, AEI, Milano, IT, vol. 1, No. 1, 1990, pp. 67-78, XP000170707, ISSN: 112-3862.

Chinese Office Action with English language translation issued Aug. 24, 2007 in Chinese Patent Application No. 200380107932.6, 13 pages.

Chinese Office Action with English language translation issued Jan. 25, 2008 in Chinese Patent Application No. 200380107932.6, 4 pages.

Chinese Office Action with English language translation issued Jun. 24, 2007 in Chinese Patent Application No. 200380107932.6, 15 pages.

Database WPI Section EI, Week 200247 Derwent Publications Ltd. London, GB; AN 2002-441855 XP002246945 & KR 2002 002 034 A (Geosystems Inc.) Jan. 9, 2002.

Devalla b., et et al. "Adaptive connection admission control for mission critical real time communication networks," Military Communication Conference, 1998 MILCOM 98, Proceedings, IEEE Boston, MA Oct. 18-21, 1998 NY, NY pp. 614-620.

Keiler et al., "Efficient Linear Prediction for Digital Audio Effects," Proceedings of the COST G-6 Conference on Digital Audio Effects (DAFX-00), Verona, Italy, Dec. 7-9, 2000, pp. 1-6.

Lenstra, et al., "Analysis of Bernstein's Factorization Circuit," Advances in Cryptology—ASIACRYPT 2002, 8th Int'l Conference on the Theory and Application of Cryptology and Information Security, Queenstown, New Zealand, Dec. 1-5, 2002, 26 pages.

Newton, Harry, "Newton's Telecom Dictionary," ISBN # 1-57820-069-5, Malt Kelsey published, pp. 96-97, Feb. 2001.

Newton, Harry, "Newton's Telecom Dictionary," ISBN # 1-57820-069-5, Malt Kelsey published, pp. 17, Feb. 2001.

Newton, Harry, "Newton's Telecom Dictionary," ISBN # 1-57820-069-5, Malt Kelsey published, pp. 523, Feb. 2001.

Notice of Allowance issued in U.S. Appl. No. 09/772,110 issued on Jul. 27, 2005, 8 pages.

Notice of Allowance issued in U.S. Appl. No. 09/772,110 issued on Jan. 18, 2005, 8 pages.

Notice of Allowance issued in U.S. Appl. No. 10/015,013 issued on Jul. 3, 2008, 21 pages.

Notice of Allowance issued in U.S. Appl. No. 10/299,285 issued on Mar. 20, 2007, 9 pages.

Notice of Allowance issued in U.S. Appl. No. 10/402,878 issued on Jan. 29, 2009, 12 pages.

Office Action issued in U.S. Appl. No. 09/738,010 issued on Jan. 26, 2005, 19 pages.

Office Action issued in U.S. Appl. No. 09/738,010 issued on Mar. 10, 2004, 15 pages.

Office Action issued in U.S. Appl. No. 09/772,110 issued on Jan. 12, 2004, 13 pages.

Office Action issued in U.S. Appl. No. 09/772,110 issued on May 8, 2003, 21 pages.

Office Action issued in U.S. Appl. No. 10/015,013 issued on Feb. 5, 2008, 16 pages.

Office Action issued in U.S. Appl. No. 10/015,013 issued on Aug. 29, 2006, 12 pages.

Office Action issued in U.S. Appl. No. 10/015,013 issued on Mar. 12, 2007, 12 pages.

Office Action issued in U.S. Appl. No. 10/015,013 issued on Jul. 5, 2005, 16 pages.

Office Action issued in U.S. Appl. No. 10/015,013 issued on Jul. 7, 2004, 26 pages.

Office Action issued in U.S. Appl. No. 10/015,013 issued on Jan. 20, 2004, 12 pages.

Office Action issued in U.S. Appl. No. 10/299,285 issued on Aug. 28, 2006, 18 pages.

Office Action issued in U.S. Appl. No. 10/402,878 issued on Sep. 28, 2007, 13 pages.

Office Action issued in U.S. Appl. No. 10/402,878 issued on Feb. 21, 2007, 17 pages.

Office Action issued in U.S. Appl. No. 10/402,878 issued on Sep. 1, 2006, 17 pages.

Office Action issued in U.S. Appl. No. 10/943,677 issued on Jul. 17, 2008, 55 pages.

Office Action issued in U.S. Appl. No. 10/943,677 issued on Nov. 27, 2007, 21 pages.

Office Action issued in U.S. Appl. No. 11/972,321, issued on May 5, 2009, 13 pages.

PCT International Search Report and Written Opinion issued in PCT International Application No. PCT/US2010/020606 dated Jun. 2, 2010, 15 pages.

Roche, C., et al., "Performance of congestion control mechanisms in wormhole routing networks," INFOCOM '97, Sixteen Annual Joint Conference of the IEEE Computer and Communications Societies, driving the Information Revolution, Proceedings IEEE Kobe, Japan, Apr. 7-11, 1997, Los Alamitos, CA pp. 1365-1372.

Rodriguez-Fonollosa, Jose A., et al., signal Processing V. Theories and Applications, Elsevier Science Publishers B.V., 1990 :A New Algorithm for Adaptive IIR Filtering Based on the Log-Area Ration Parameters, p. 257-260.

Shan, Peijun, et al. DPS Research Laboratory Virginia Tech, The Bradley Department of Electrical and Computer Engineering, XP 0009322374 "FM Interference Suppression in Spread Spectrum Communications Using Time-Varying Autoregressive Model Based Instantaneous Frequency Estimation," p. 2559-2562, Proceedings IEEE International Conference on Acoustics, Speech, and Signal Processing, 1999. vol. 5.

Shynk, John J. XP-002236570 Department of Electrical & Computer Engineering University of California, Ch2561-9/88/0000/1554 1988 IEEE, p. 1554-1557, "On Lattic-Form Algorithm for Adaptive IIR Filtering".

Takawira, F. "Adaptive Lattice Filters for Narrowband Interference Rejection in DS Spread Spectrum Systems," Proceedings of the 1994 IEEE South African Symposium on Communications and Signal Processing, 1994, COM-SIG-94, Oct. 4, 1994, pp. 1-5.

Tianren, et al., "Vector Quantization Based Upon Bandpass Filtering Applied to Speech Recognition," Department of Electronic and Information Engineering, Hauzhong University of Science and technology, Wuhan, China CH2614-6/88/0000/1091, 1988 IEEE, p. 1091-1093.

Verdu et al., "Spectral Efficiency of CDMA with Random Spreading," IEEE Transactions on Information Theory, vol. 45, No. 2, Mar. 1999, 19 pages.

Zeidler, et al. "Frequency Tracking Performance of Adaptive Lattice Filters." Conference Record of the Twenty-Fifth Asilomar Conference on Signals, Systems and Computers, 1991, Nov. 4-6, 1991, vol. 2, pp. 643-649.

* cited by examiner

$2^0\ 2^1\quad 2^2$

|   | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 0 | 1 | 0 | 1 | 0 | 1 |
| 2 | 0 | 0 | 1 | 1 | 0 | 0 | 1 | 1 |
| 3 | 0 | 1 | 1 | 0 | 0 | 1 | 1 | 0 |
| 4 | 0 | 0 | 0 | 0 | 1 | 1 | 1 | 1 |
| 5 | 0 | 1 | 0 | 1 | 1 | 0 | 1 | 0 |
| 6 | 0 | 0 | 1 | 1 | 1 | 1 | 0 | 0 |
| 7 | 0 | 1 | 1 | 0 | 1 | 0 | 0 | 1 |

FIG. 3A

$2^0\quad 2^1\quad 2^2$

|   | 1 | 2 | 4 |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

$2^0\quad 2^2$

| 1 | 4 | 5 |
|---|---|---|
| 0 | 0 | 0 |
| 1 | 0 | 1 |
| 0 | 0 | 0 |
| 1 | 0 | 1 |
| 0 | 1 | 1 |
| 1 | 1 | 0 |
| 0 | 1 | 1 |
| 1 | 1 | 0 |

CODING A SIGNAL WITH A SHUFFLED-HADAMARD FUNCTION

CROSS-REFERENCE TO RELATED APPLICATIONS

This application is a continuation-in-part of U.S. application Ser. No. 10/943,677, filed Sep. 16, 2004, which is a continuation U.S. application Ser. No. 09/730,697, filed Dec. 5, 2000, now U.S. Pat. No. 6,829,289; and a continuation-in-part of U.S. application Ser. No. 10/402,878, filed Mar. 28, 2003.

TECHNICAL FIELD

This document relates generally to communication systems and methods and, more particularly, to wireless communications systems and methods.

BACKGROUND

Some wireless communications systems employ code division multiple access (CDMA) protocols. CDMA systems may receive digital data, encode the data in one step and spread the frequency of the encoded data in a second step. The encoding and spreading steps in such systems may consume a finite amount of time and processing power, and the ability with which a resulting coded and spread signal can communicate the received digital data over a medium may depend on various factors, such as physical characteristics of the medium, available processing power, and process gain that is applied in the encoding and spreading steps.

SUMMARY

This document describes systems, apparatus and methods for efficiently communicating data from a transmitter to a receiver over a medium. In particular, a transmitter can receive data in short units that correspond to one of a predetermined number of data values that are each associated (e.g., uniquely) with a corresponding number of codes. The transmitter can send the code that is associated with the received unit of data, in place of the received unit of data itself. In some implementations, the codes are drawn from columns of a $2^N \times 2^N$ Hadamard matrix whose rows have been randomly shuffled. Only certain columns of the shuffled matrix may be stored at the transmitter, such as, for example, columns having power-of-two indices; and a column to be transmitted may be dynamically generated at the transmitter by application of a logical function (e.g., bit-wise application of an exclusive-OR function) to one or more of the stored columns. The receiver may employ a number of correlators that calculate correlations between received data and each possible code employed by the transmitter. Based on the strongest calculated correlation, the receiver may determine which of the predetermined number of data values the transmitter sent. Process gain may be set such that data can be communicated between the transmitter and receiver at very low signal-to-noise ratios.

In some implementations, a method includes receiving, at an electronic transmitter device, for communication to an electronic receiver device, a first data value corresponding to one of a plurality of predetermined data values; identifying, from a matrix of data bits in the form of a $2^N \times 2^N$ Hadamard matrix whose rows have been randomly or pseudo-randomly shuffled, a column of data bits that is associated with the first data value; and transmitting to the electronic receiver device, in place of the first data value, the identified column of data bits.

The method can further include receiving data at the electronic receiver; correlating the received data to the identified column of data bits; and providing the first data value for further processing by the electronic receiver. In some implementations, correlating the received data to the identified column of data bits can include calculating a correlation between the received data and each column in the matrix of data bits to which is associated one of the predetermined data values; and determining that the received data is most strongly correlated to the identified column of data bits. Calculating can include calculating a sign of the correlation, and determining comprises determining based on the calculated sign. Correlating the received data to the identified column of data bits can include calculating a Hadamard transform or fast Hadamard transform.

The method can further include associating the first data value to the column of data bits in a manner that the first data value can be determined by the electronic receiver, from the transmitted column of data bits, in discrimination to other data transmitted by the electronic transmitter device. Identifying the column of data bits can include applying a logical function to two or more columns of bits from the matrix of data bits. Each column in the two or more columns can have a power-of-two column index. Applying the logical function can include applying, bit-wise, an exclusive-OR function to the two or more columns.

In some implementations, identifying the column of data bits can include identifying the $m^{th}$ column, and applying the logical function comprises applying, bit-wise, an exclusive-OR function to each power-of-two column in the matrix of bits whose $m^{th}$ row has a value equal to a first predetermined value. The method can further include storing in a memory device included in each of the electronic transmitter device and the electronic receiver device, a $2^N \times N$ matrix corresponding to columns of the matrix of data bits having power-of-two indices.

Transmitting the identified column of data bits can include transmitting, in order and one bit at a time, each bit contained in the identified column. Each of the predetermined data values can have a fixed number of one or more data bits.

In some implementations, a method can include receiving, at an electronic transmitter device, for communication to an electronic receiver device, a first data value corresponding to one of a plurality of predetermined data values; identifying, from a matrix of data bits in the form of a $2^N \times 2^N$ Hadamard matrix whose rows have been randomly or pseudo-randomly shuffled, an $m^{th}$ column of data bits that is associated with the first data value; generating the $m^{th}$ column of bits, including applying, bitwise, an exclusive-OR function to one or more power-of-two columns from the matrix of bits whose $m^{th}$ row has a value equal to a first predetermined value; and transmitting to the electronic receiver device, in place of the first data value, the dynamically generated $m^{th}$ column of data bits.

The method can further include storing the $2^N \times 2^N$ Hadamard matrix of data bits in a compressed $2^N \times N$ matrix in which only columns of the matrix of data bits having power-of-two column indices are stored in the electronic transmitter device. Generating the $m^{th}$ column of bits can include determining one or more columns in the compressed $2^N \times N$ matrix whose $m^{th}$ row has a value equal to the first value, and applying, bitwise, an exclusive-OR function to the one or more columns.

In some implementations, a system can include an electronic receiver; and an electronic transmitter that receives for communication to the electronic receiver a first data value corresponding to one of a plurality of predetermined data values. The electronic transmitter can identify, from a matrix of data bits in the form of a $2^N \times 2^N$ Hadamard matrix whose rows have been randomly or pseudo-randomly shuffled, a column of data bits that is associated with the first data value, and transmit to the electronic receiver device, in place of the first data value, the identified column of data bits. The electronic receiver can receive data, correlate the received data to the identified column of data bits, and provide to circuitry within the electronic receiver the first data value for further processing.

The electronic transmitter can include a memory device that stores the $2^N \times 2^N$ Hadamard matrix of data bits in a compressed $2^N \times N$ matrix in which only columns of the matrix of data bits having power-of-two column indices are stored. In some implementations, the identified column of data bits is the $m^{th}$ column of the matrix of data bits; and the electronic transmitter includes circuitry for generating the $m^{th}$ column from the compressed $2^N \times N$ matrix by applying, bitwise, an exclusive-OR function to one or more columns in the compressed $2^N \times N$ matrix whose $m^{th}$ row has a first value.

The electronic receiver can include a number of correlators that calculate correlations between the received data and each of a corresponding plurality of columns of the matrix of data bits to which data values in the plurality of predetermined data values are associated. The electronic receiver can further include circuitry that (a) determines which of the corresponding columns from the matrix of data bits has the strongest calculated correlation to the received data and (b) outputs a data value from the plurality of predetermined data values that is associated with the determined corresponding column.

In some implementations, a system can include an electronic receiver; and an electronic transmitter that receives a first data value corresponding to one of a plurality of predetermined data values for communication to the electronic receiver; and a means for transmitting from the transmitter data bits from a matrix having the form of a $2^N \times 2^N$ Hadamard matrix whose rows have been randomly or pseudo-randomly shuffled, in place of the first data value. The can further include a means for receiving data at the electronic receiver and for determining that the received data is correlated to the first data value.

In some implementations, a system includes an electronic receiver; and an electronic transmitter that receives for communication to the electronic receiver a first data value corresponding to one of a plurality of predetermined data values. The transmitter can identify, from a matrix of data bits having the form of a $2^N \times 2^N$ Hadamard matrix whose rows have been randomly or pseudo-randomly shuffled, a column of data bits that is associated with one of the plurality of predetermined data values, and transmit to the electronic receiver device, in place of and based on the first data value, the identified column of data bits or a complement of the identified column of data bits. The electronic receiver can receive data, correlate the received data to the identified column of data bits or the complement, and provide to circuitry within the electronic receiver the first data value for further processing.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document describes systems, apparatus and methods for efficiently communicating data from a transmitter to a receiver over a medium. In particular, a transmitter can receive data in short units that correspond to one of a predetermined number of data values that are each associated (e.g., uniquely) with a corresponding number of codes. The transmitter can send the code that is associated with the received unit of data, in place of the received unit of data itself. In some implementations, the codes are drawn from columns of a $2^N \times 2^N$ Hadamard matrix whose rows have been randomly shuffled. Only certain columns of the shuffled matrix may be stored at the transmitter, such as, for example, columns having power-of-two indices; and a column to be transmitted may be dynamically generated at the transmitter by application of a logical function (e.g., bit-wise application of an exclusive-OR function) to one or more of the stored columns. The receiver may employ a number of correlators that calculate correlations between received data and each possible code employed by the transmitter. Based on the strongest calculated correlation, the receiver may determine which of the predetermined number of data values the transmitter sent. Process gain may be set such that data can be communicated between the transmitter and receiver at very low signal-to-noise ratios.

Figure 1:
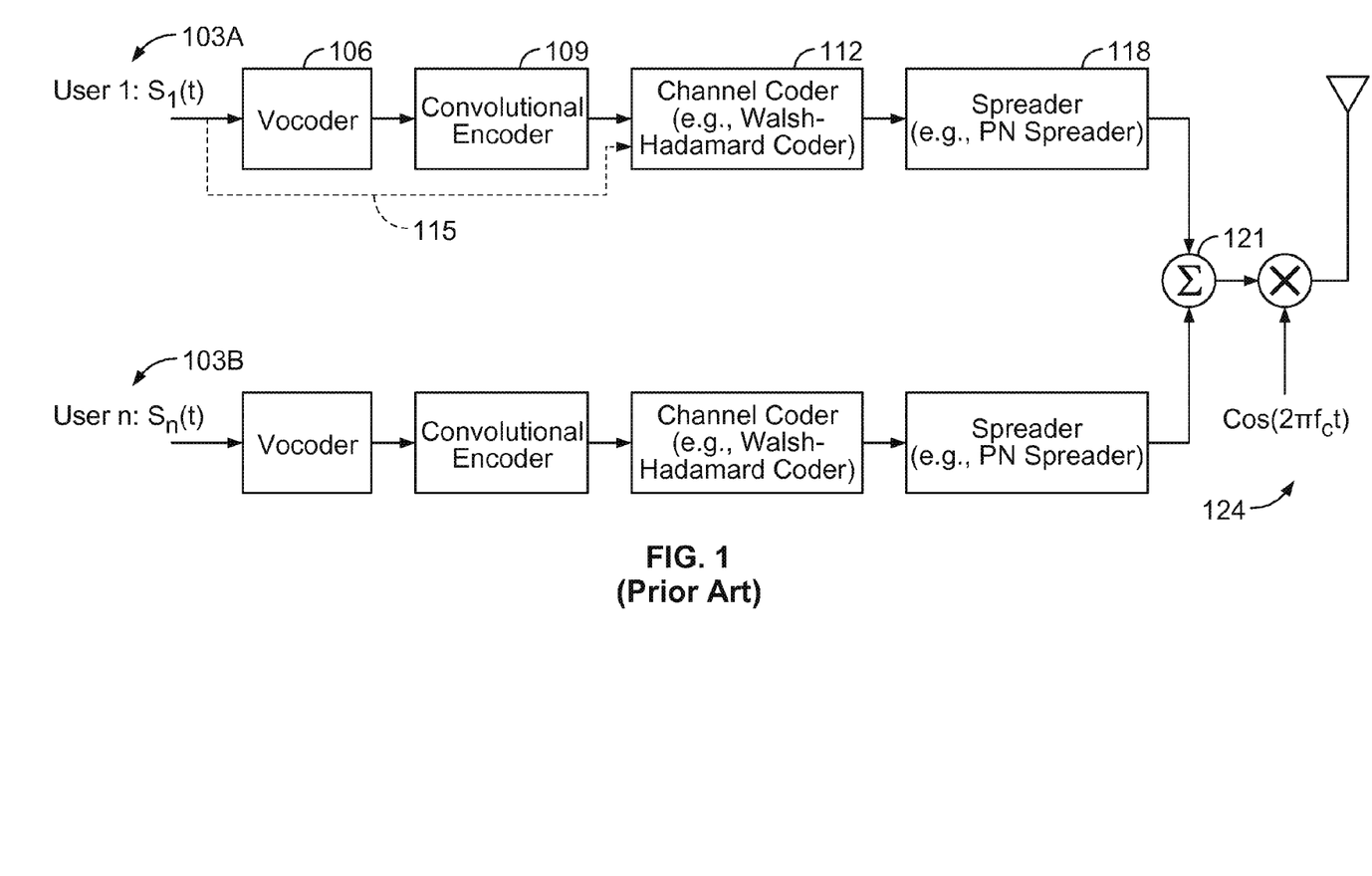
FIG. 1 shows an example prior art wireless transmitter that employs separate channel and PN codes.

For context, FIG. 1 shows an example prior art wireless transmitter 101 that employs separate channel and pseudo-noise (PN) codes. User data signals 103A and 103B are shown (e.g., speech signals), which can, in some implementations, be digitized by a vocoder 106 and encoded by a convolutional encoder 109. The vocoder 106 can both digitize and compress the voice signal 103A in various ways, and the convolutional encoder 109 can add information that can be subsequently employed for error correction.

In some implementations, each n bits of vocoded data that are input into the convolutional encoder 109 are translated into m symbols. For example, every two bits may be coded as a four-bit symbol; as another example, every four bits may be coded as an eight-bit symbols; etc. Symbols output from the convolutional encoder 109 can be further processed by a channel coder 112. In some implementations, each stream of data 103A and 103B can be coded with a different channel code by a channel coder (e.g., channel coder 112, which, in some implementations, is a Hadamard-Walsh coder). Channel coding each data stream with a different channel code can facilitate a system that accommodates many users on the same frequency, at the same time. In many implementations, each channel of data is assigned an orthogonal code, which can minimize the interference between channels. Once channel coded, the frequency content of each stream of data can be further spread, for example by a PN (pseudo-noise) spreader 118.

Multiple channels of information can be combined at a combiner 121, and the output of the combiner 121 can be used to modulate a carrier signal 124, which can be used to communicate the information through a physical medium. In other implementations (not shown), a single channel of data can transmitted, and the combiner 121 can be omitted.

An antenna and air interface are depicted in FIG. 1, but communication across other media are possible. For example, a carrier light signal could be modulated by the combined signal and driven through a fiber optic interface. Other carriers and media are possible.

In some implementations, incoming user data 103A may be already digitized data. (That is, the incoming data may be in a digital form, rather than in analog or pre-sampled audio form.) In such implementations, the vocoder 106 and/or convolutional encoder 109 may be bypassed, and the digitized data may be routed directly (e.g., along path 115) to the channel coder 112.

In the above-described example process, each step may add additional data, or process gain, to the original signal. For example 9,600 bits per second (bps) of data may be output by the vocoder 106, but every two bits from the vocoder 106 may be represented by a four bit symbol by the convolutional encoder 109, such that the convolutional encoder 109 outputs symbol data at a rate of 19,200 bps. Similarly, each bit of the symbol data may be combined with a 64-bit Walsh code, such that the resulting channel-coded symbols are part of a 1,228,800 bps (1.2 Mbps) stream of data.

In some implementations, channel-coded data is combined with a spreading code having the same data rate. For example, a 1.2 Mbps stream of channel-coded data can be combined on a bit-by-bit basis (e.g., with an exclusive-OR function) with a 1.2 Mbps PN spreading code. In other implementations that employ a spreading code, the spreading code can add additional data, or process gain, to the output data stream. That is, in such implementations, each bit in the channel-coded data stream can be combined with multiple PN bits (e.g., 2 bits, 4 bits, 5 bits, 64 bits, etc.).

Overall process gain can be represented as a logarithm of a spreading ratio (e.g., the ratio of the bandwidth of the final processed signal (e.g., the spread, coded signal) to the bandwidth of the unprocessed input signal), and may be expressed in decibels. Thus, in one of the above examples, the process gain can be expressed as 1,228,800/9,600=128, or 10 $\log_{10}$ (128)=21 dB.

In some contexts, process gain can provide a useful indication of how effectively an output signal will convey the underlying information through a medium. Put another way, process gain can provide an indication of how resistant to noise and interference the output signal will be. Generally, the higher the process gain, the more noise in a medium a signal can tolerate as it is propagated through the medium. In addition, higher process gain may also indicate that a signal more closely resembles noise, spectrally, than a signal with a lower process gain.

As one will understand from the above example, process gain and data-carrying bandwidth are generally inversely related at the individual channel level. Thus, output signals that are very immune to noise or interference may have less data-carrying bandwidth than signals that are less immune to noise or interference. To put this more concretely, an output signal with twice the data-carrying bandwidth and half the spreading ratio (e.g., a spreading ratio of 64, rather than 128—or 10 $\log_{10}(64)$=18 dB, rather than 10 $\log_{10}(128)$=21 dB) may be less immune to noise and interference. By balancing process gain with data-carrying bandwidth parameters, a system designer can design a communication system to achieve particular reliability, noise or throughput specifications.

Figure 2:
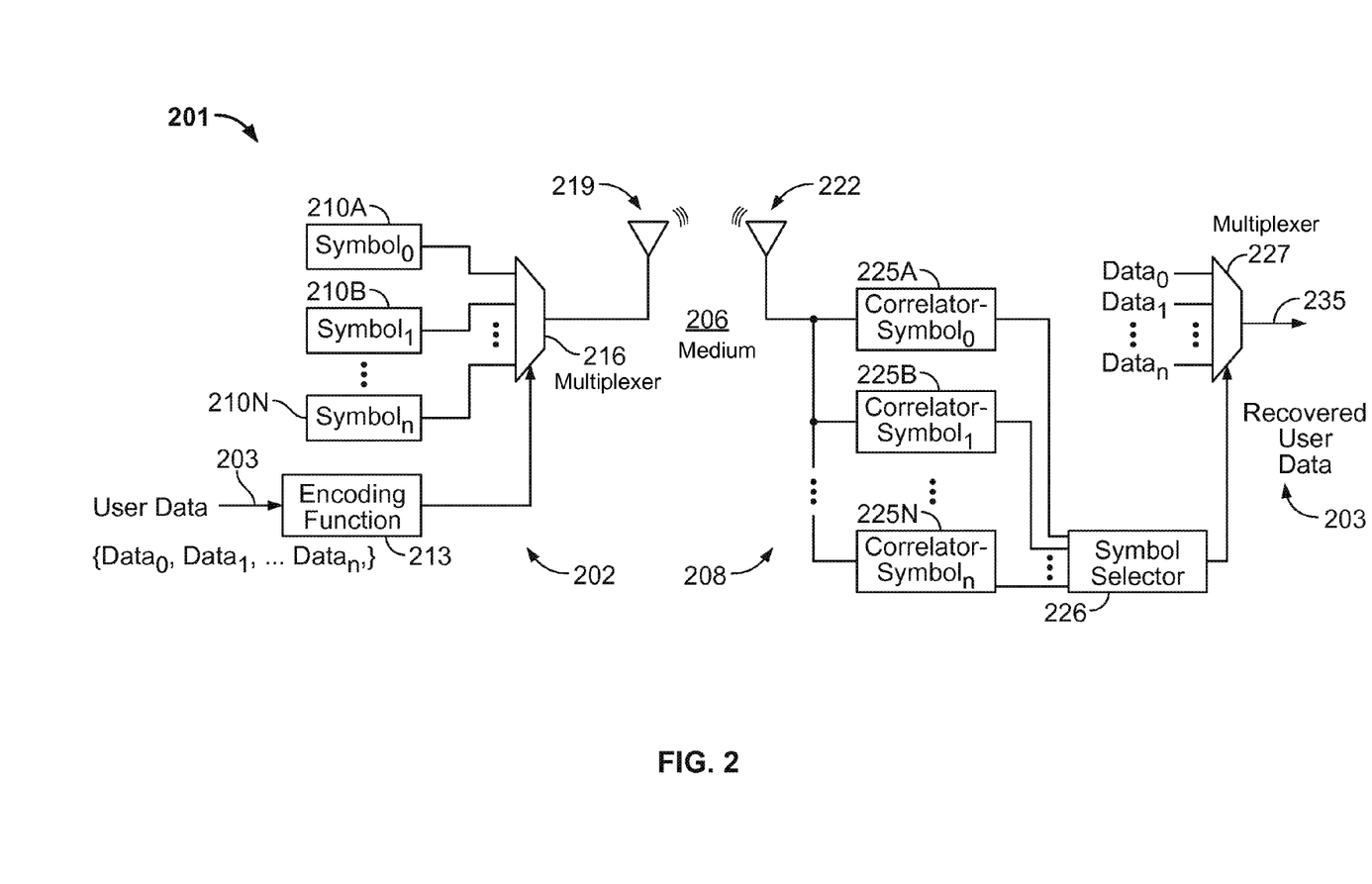
FIG. 2 is a block diagram of an example system that can have a high process gain.

FIG. 2 is a block diagram of an example system that can have a high process gain. The high process gain can enable reliable communication over a very noisy medium. In addition, the high process gain can add security to the communication by making the transmitted information look, spectrally, very close to the ambient noise in the medium.

As depicted in one example, the system 201 includes a transmitter 202 that receives user data 203, processes the user data and communicates representative data over a medium 206 (e.g., an air interface, water interface, fiber optic interface, etc.); and a receiver 208 that receives the representative data and processes that representative data to recover the user data.

In the example of FIG. 2, one of a number of different symbols (210A-210N) is communicated over the medium 206 at any given time (e.g., at each symbol time), and the particular symbol that is communicated at each given time is selected by an encoding function 213 that processes the user data 203. For example, the user data 203 can be processed by the encoding function 213 to control a multiplexer 216 that communicates a specific, unmodified symbol 210A-210N over the medium 206, via a transmission circuit 219.

In some implementations, one of two symbols are transmitted for each bit of data in the user data stream 203. That is, during a symbol time, each bit in the symbol is clocked out, at a chip time, to the transmission circuit 219. The specific symbol that is clocked out can be selected based on the corresponding value of the bit of data. (Throughout this description, examples are provided with binary data values (i.e., values of either '1' or '0'), but the reader will appreciate that each bit of data may have more than two possible values. For example, multistate circuitry or devices may employ three, four, or some other number of possible values for each data bit.) For example, the first symbol 210A may be clocked out for a bit in the user data 203 that has a value of '0,' and the second symbol 210B may be clocked out for a bit in the user data 203 that has a value of '1.' In other implementations, one of sixteen different symbols is clocked out for every four bits of data in the user data stream 203; the particular symbol that is that is clocked out may be selected based on the values the corresponding four data bits. That is, each set of four data bits may take on one of a number of different predetermined or expected values, and each data value may be uniquely associated with a different code or symbol. For example, "0000" in the user data 203 may result in the first symbol 210A being selected and clocked out; "0001" may result in the second symbol 210B being selected and clocked out" "1001" may result in the tenth symbol being selected and clocked out; etc. Various implementations may employ different numbers of symbols, and the different symbols may be selected in various manners.

The symbol time can depend on the rate at which the user data 203 is supplied to the encoding function 213, and the chip time can depend on both the symbol time and the number of bits in the symbol. For example, for a user data stream 203 that supplies bits to the encoding function at 19,200 bps, the symbol period may be $\frac{1}{19,200}$ second, or about 52 μs. If each symbol has 16 bits (corresponding to a process gain of 16), then individual bits can be clocked out every 1/(19,200*16) second, or every 3.26 μs, at a frequency of 307.2 KHz. If the user data stream 203 supplies bits to the encoding function at 19,200 bps, but each symbols is 8192 bits long, then the symbol period can again be 52 μs, but the individual symbol bits can be clocked out at a chip rate of 1/(19,200*8192) second, or every 6.4 ns, at a frequency of 157 MHz.

Various symbol rates, chip rates and process gains are possible. As indicated above, process gain, and bandwidth— which can be functions of the symbol rate and the relationship between the symbol and the underlying data it encodes—can be varied to achieve specific system design goals. In some implementations, it may be advantageous to have a chip rate that is at or below 30 MHz. In some locales, this frequency may be a threshold frequency below which governmental entities exercise less restrictive controls and/or in which there is less competition for bandwidth. Because signals at this frequency may be more susceptible to interference than signals at much higher frequencies, a very large process gain may also be desirable.

The table below illustrates various example data rates having a relatively low chip rate and a relatively high process gain.

TABLE 1

Example data/symbol/chip rates

| Data Rate | Data bits/symbol | Symbol rate | Chips/symbol | Process gain | Chip rate |
|---|---|---|---|---|---|
| 26,367 bps | 4 | 54 MHz/8192 = 6,592 Hz | 8192 | 8192/4 = 2048; 10 log10 (2048) = 33 dB | 54 MHz |
| 3662 bps | 1 | 30 MHz/8192 = 3662 Hz | 8192 | 8192/1 = 8192; 10 log10 (8192) = 39 dB | 30 MHz |
| 2400 bps | 1 | 2400 Hz | 8192 | 39 dB | 2400 * 8192 = 19.7 MHz |
| 1200 bps | 1 | 1200 Hz | 16,384 | 16,384/1 = 16,384; 10 log10 (16,384) = 42 dB | 1200 * 8192 = 19.7 MHz |
| 4800 bps | 1 | 4800 Hz | 4096 | 4096/1 = 4096; 10 log10 (4096) = 36d dB | 4800 * 4096 = 19.7 MHz |
| 9600 bps | 4 | 2400 Hz | 8192 | 8192/4 = 2048; 10 log10 (2048) = 33 dB | 2400 * 8192 = 19.7 MHz |

In some implementations, data may be transmitted in binary form, without the need for a carrier signal. For example, binary data may be converted to an analog signal (e.g., a one-volt signal), and the analog signal may be used to directly drive an antenna, as is described in more detail in U.S. application Ser. No. 09/772,110, filed Jan. 26, 2001, now U.S. Pat. No. 6,982,945. Data may be transmitted in other ways, including, for example, in ways described in co-pending U.S. application Ser. No. 10/943,677 and in co-pending U.S. application Ser. No. 10/402,878, both of which are herein incorporated by reference.

At the receiver 208, symbol data can be received at a receive circuit 222, and the symbol data can be correlated against each possible symbol (i.e., the symbols 210A-210N that may have been transmitted by the transmitter 202) by corresponding correlators 225A-225N. The symbol that is determined to correlate most closely to the received symbol data can be deemed to represent the underlying user data. This user data can then be directly provided by a circuit, which, for purposes of illustration, is represented as a symbol selector 226 and multiplexer 227. Additional details of example correlation processes are provided below with reference to FIG. 5.

The above description is provided in the context of the transmitter 202 and receiver 208 employing a common set of symbols. Various methods of selecting and coordinating symbols between the transmitter and receiver are possible, and any suitable method can be employed. By employing different sets of codes for different transmitter-receiver pairs, simultaneous communications between pairs may be possible. Moreover, by replicating multiple transmitters 202 (each employing a different set of codes) within a first device and multiple corresponding receivers 208 within a second device, parallel communications between the first device and second device may be effectively increased (e.g., aggregated) without a reduction in process gain. More specifically, for example, each transmitter/receiver device pair can include multiple transmit/receive circuits, each circuit employing a different set of codes and/or a different antenna to form multiple communication channels. Each channel can employ a relatively high process gain, as described above, but different data (e.g., different portions of a single input stream) can be sent through each of the multiple channels, such that data-carrying bandwidth across all of the (aggregated) multiple channels is increased, even though each channel's process gain is fixed (e.g., at a relatively high value).

Several advantages may follow from the system shown in FIG. 2. As one example, process gain may be readily adjusted. More particularly, by changing the length of each symbol, or the ratio of the number of bits in the user data that are used to select a symbol and the number of bits in the symbol itself, the process gain can be readily adjusted, as is exemplified in Table 1 above. In implementations in which the symbols are drawn from a Hadamard matrix (e.g., as described in more detail below), increasing process gain may include employing a larger Hadamard matrix, or portion of a Hadamard matrix.

As another example, a modulation step may be eliminated. That is, as mentioned above, the symbol data may be used to directly drive an antenna in a binary manner, without requiring a carrier signal and the associated process and circuitry of modulating the carrier signal on the transmit side and demodulating the carrier signal on the receive side.

As another example, multiple user data may be effectively coded and spread simultaneously. That is, the specific group of symbols that are used for any given channel may differ from the group of symbols employed in other channels, such that the group itself serves to code a given channel. Moreover, if the length and spectral content of each channel is carefully selected, the symbol itself can provide enough spreading of the underlying user data that no additional spreading may be desired. For example, as is described in greater detail below, a symbol that is 8K bits long (e.g., with bits that are randomly or pseudo-randomly distributed) may serve to effectively spread the spectral content of an underlying data signal. (Note that for purposes of clarity, bits are described throughout this document as being "randomly" shuffled. Unless explicitly noted otherwise, randomly shuffled bits can include bits that have been shuffled through a pseudo-random process.)

In some implementations, Walsh or Hadamard codes provide useful initial symbols. The bits in Hadamard codes can be randomly or pseudo-randomly shuffled, which may improve the usefulness of such functions as symbols for coding data as is described above.

Hadamard codes can be generated using an iterative process of constructing a Hadamard matrix. Starting with $H_1 = [0]$, the Hadamard matrix can be built by:

$$H_{2n} = \begin{pmatrix} H_n & H_n \\ H_n & \overline{H_n} \end{pmatrix}$$

For example, the Hadamard codes of lengths two and four are shown respectively as:

$$H_2 = \begin{pmatrix} 0 & 0 \\ 0 & 1 \end{pmatrix}$$

$$H_4 = \begin{pmatrix} 0 & 0 & 0 & 0 \\ 0 & 1 & 0 & 1 \\ 0 & 0 & 1 & 1 \\ 0 & 1 & 1 & 0 \end{pmatrix}$$

From the corresponding matrices shown above, the Hadmard codes are given by the columns (or rows, given that an unshuffled Hadamard matrix is symmetrical about its main diagonal). These Hadamard codes can be useful given that they are orthogonal to each other. As such, different signals can be coded by different orthogonal Hadamard codes, then transmitted over the same frequency channel, and the different signals can be recovered at the receiving end using the same orthogonal Hadamard codes.

Two additional properties of Hadamard codes and matrices are now described. First, Hadamard matrices have a property that enables them to be stored in compressed form. In particular, as is described in more detail below, only the power-of-two columns need to be stored; the rest of the columns can be dynamically determined from the power-of-two columns. Second, although short Hadamard codes have not typically been employed as spreading codes, longer Hadamard codes can be so employed, particularly after the bits have been shuffled, as described in more detail below.

Figure 3A:
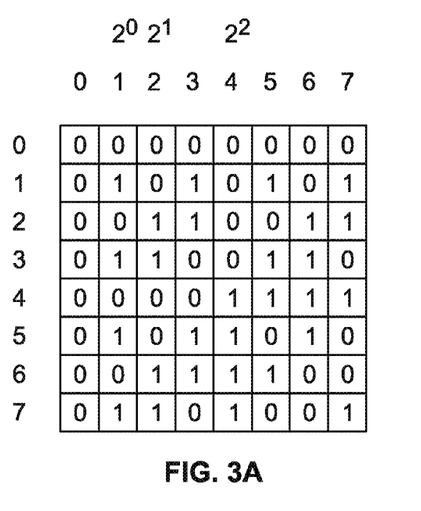
FIGS. 3A and 3B illustrate an example Hadamard matrix and certain properties thereof.
Figure 3B:
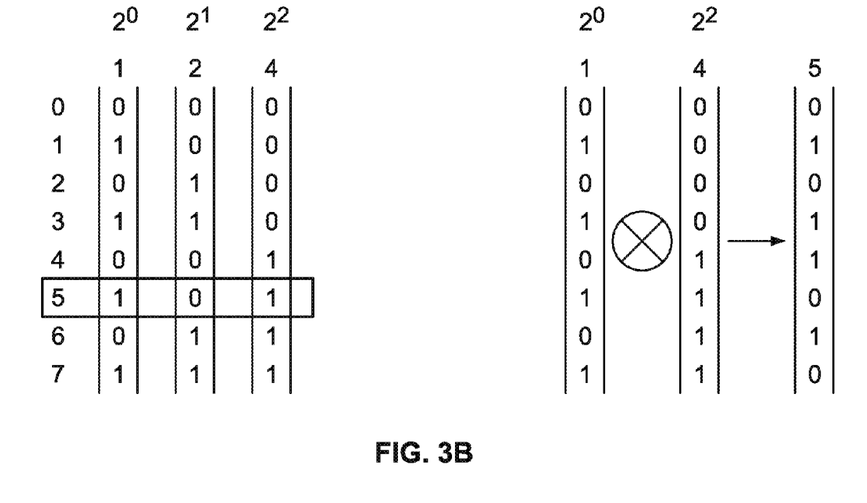

Storing Hadamard matrices in compressed form is now described. Any column of a Hadamard matrix can be dynamically generated from the power-of-two columns of the Hadamard matrix, as is depicted in FIGS. 3A and 3B. For purposes of referencing particular columns in this description, an 8×8 Hadamard matrix is shown in FIG. 3A, and this matrix can be generated in the iterative manner described above, or in any other appropriate manner. Each column and row is indexed from 0 to 7, and the power-of-two columns (i.e., the columns having an index that is a power of two) are indicated as such.

To generate a column having a particular index from the power-of-two column(s), an exclusive-OR function can be applied to the power-of-two columns whose values are '1' in the row corresponding to the particular index of the desired column. Thus, with reference to FIG. 3B, to generate column [5], the rows corresponding to row index 5 in each of the power-of-two columns can be inspected, and an exclusive-OR function can be applied to those power-of-two columns having a '1' in the [5] row. In this example, the "$2^0$" and "$2^2$" columns have a '1' in row [5], so an exclusive-OR function can be applied (e.g., cell-by-cell, in each row) to these columns to dynamically generate column[5], as shown. This same process can be applied to generate any other column of the matrix.

In the preceding example, the Hadamard matrix is small, and relative to the small size, it may be efficient to store all columns of the matrix, rather than dynamically generating columns that are not power-of-two columns. For larger Hadamard matrices, however, storing the Hadamard matrix in compressed form can significantly reduce the size of memory needed to store the matrix. For example, a Hadamard matrix having dimensions $2^N \times 2^N$ can be stored as a $2^N \times N$ matrix. For N=13, compressing the Hadamard matrix as described above results in a matrix having 8192×13 entries (e.g., just under 128 K entries), rather than the 8192×8192 entries (~56 M entries) that the matrix would have in uncompressed form. Compression in this manner with N=13 results in a matrix that is about 630 times smaller than its uncompressed counterpart.

Modifying the above-described Hadamard matrix in a manner that improves its ability to perform a spreading function is now described. As indicated above, Hadamard codes (e.g., the columns of a Hadamard matrix) are not generally employed to spread the spectral content of a data signal. In part, this may be because the spectral density of many standard Hadamard codes is concentrated in a small number of discrete frequencies—as may be evident from inspection of the example 4×4 and 8×8 Hadamard matrices above and in FIG. 3A, respectively—and more particularly, from the observation from these matrices that several columns have regular patterns of bits (resulting in a concentration of energy at discrete corresponding points within the frequency domain). However, by randomly, or pseudo-randomly shuffling the rows of the Hadamard matrix, desirable properties of the Hadamard matrix can be maintained (e.g., the orthogonal nature of the columns relative to each other, as is described in greater detail below), and the spreading ability of the matrix can be improved-resulting in a shuffled-Hadamard matrix that can be used for both coding and spreading.

Properties of a Hadamard matrix whose rows have been randomly shuffled are now briefly discussed. First, with respect to the compressibility described above, because any column of a Hadamard matrix can be dynamically generated by applying an exclusive-OR function to certain power-of-two columns on a row-by-row basis, and since shuffling rows affects each column in the row, shuffling has no impact on the column values, relative to each other, within any given row. Accordingly, whether the rows are shuffled or not, the Hadamard matrix can be compressed as described above.

Second, with respect to the orthogonality of the columns in the Hadamard matrix relative to each other (which can enable the columns to be used as channel codes), shuffling the rows affects each column, such that each column code is modified but in a manner that maintains the orthogonality of the columns relative to each other.

Third, randomly shuffling the rows has a similar effect as modulating with a PN a channel-coded signal in a conventional system—namely the random shuffling can introduce considerable spectral diversity to the code, and that diversity can increase as the length of the code increases (i.e., as the number of rows in the Hadamard matrix increases). Thus, by using a sufficiently long code (e.g., on the order of 8K, 4K, 1K, 512 bits, 256 bits, 128 bits, etc.), drawn from a correspondingly dimensioned Hadamard matrix with randomly shuffled rows, a data signal can be effectively channel-coded and spread simultaneously.

Figure 4:
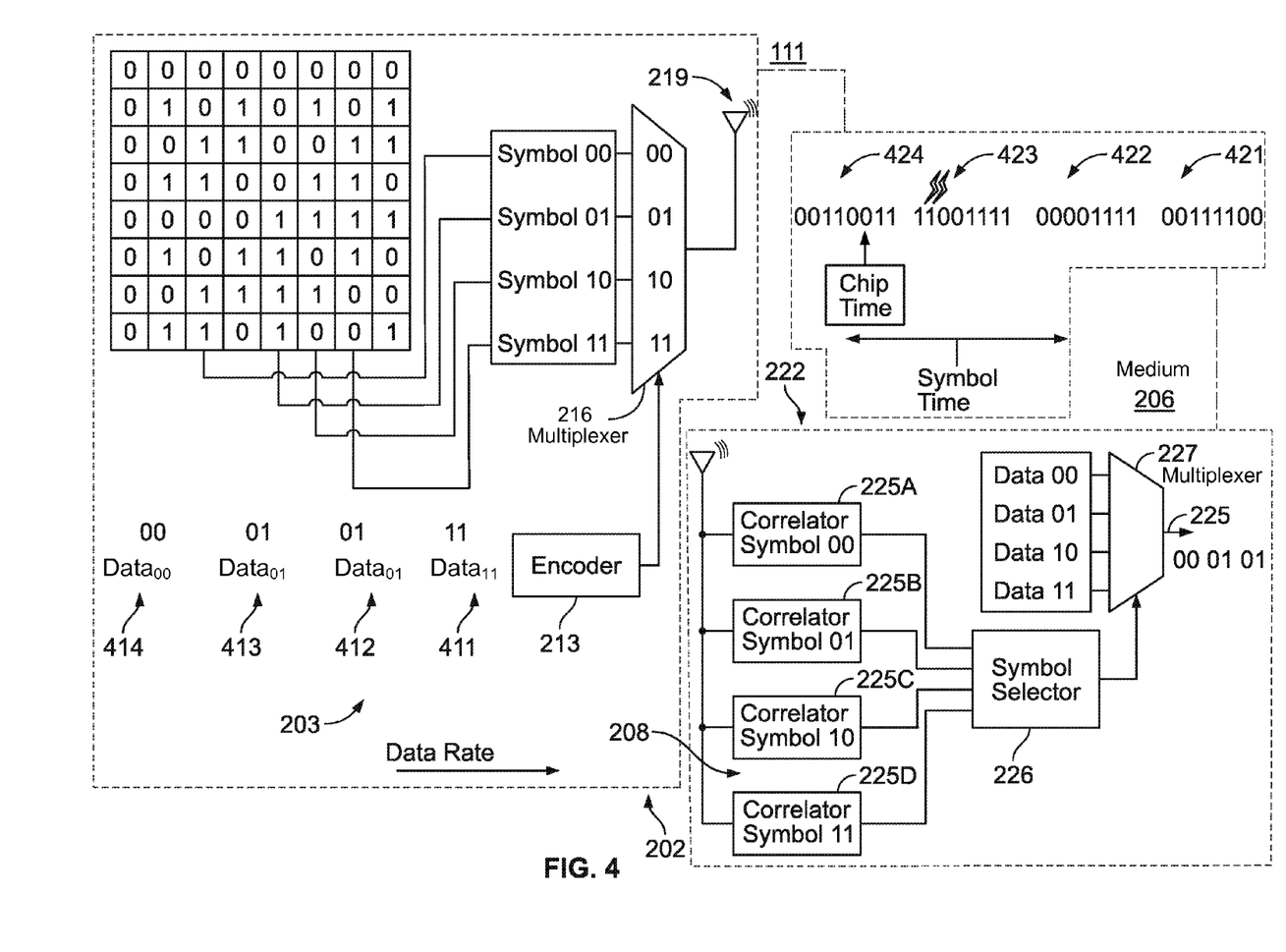
FIG. 4 illustrates additional detail of the example system shown in FIG. 2.

FIG. 4 illustrates additional detail of the system shown in FIG. 2, which can be used to receive, process and communicate user data over a medium. In particular, FIG. 4 depicts a concrete example of a user data stream being processed by the encoder 213 to select particular symbols to transmit, which themselves may be drawn from a Hadamard matrix such as the one shown in FIG. 3A.

As depicted in the example of FIG. 4, a user data stream 203 is provided to the encoder 213, and in particular a sequence of bits "11," "01," "01," and "00" are provided to the encoder (elements 411, 412, 413 and 414, respectively). (The bits are grouped for purposes of explanation, but the reader will appreciate that that encoder can receive the bits in a continuous stream of data (e.g., "11101000.")) In the example implementation shown, every two bits can be used to directly control the symbol multiplexer 216. More particularly, for example, the processing by the encoder 213 of the stream of data 203 can result in $Symbol_{11}$ ("00111100") being selected first, followed by $Symbol_{01}$ ("00001111") during the next symbol period, followed by $Symbol_{01}$ again and $Symbol_{00}$ ("00110011") in subsequent symbol periods. In other implementations, a different encoding scheme 213 can be employed.

In an implementation such as the one depicted, in which data bits are used to directly control the multiplexer 216, the encoder 213 can include circuitry, such as a shift register (not shown), to receive the serial data stream 203 and hold an appropriate number of bits (e.g., two) of the serial data stream 203 for a sufficient period of time (e.g., a symbol time) to allow the appropriate symbol to be clocked out. The encoder 213 can be synchronized to a chip clock (not shown) that actually clocks out the symbol data. In this context, clocking out symbol data can include transmitting, in order and one bit at a time, each bit in the symbol (e.g., each bit in the column of a matrix of bits, such as a column from a Hadamard matrix with randomly shuffled rows).

The symbol data that is clocked out at a chip rate can be transmitted through the medium 206 by the transmit circuit 219. For purposes of illustration, data that is transmitted through the medium 206 is represented as data blocks 421, 422, 423 and 424 (corresponding to $Symbol_{11}$, $Symbol_{01}$, modified $Symbol_{01}$ and $Symbol_{00}$, respectively).

As depicted, the symbols can be drawn from columns of a matrix of bits (e.g., from columns of a Hadamard matrix (as shown), which may have its rows randomly shuffled (random shuffling not shown in FIG. 4)). In some implementations, a large Hadamard matrix can be stored (e.g., in compressed form) in a memory device in the transmitter 202 and the receiver 208, and circuitry (not shown) can be employed at each end to select a subset of columns to use as symbols by a particular transmitter-receiver pair. The set of symbols (e.g., columns) may be dynamically determined, and may be periodically and dynamically changed. As indicated above, the appropriate set of symbols can be coordinated in various ways between a paired transmitter and receiver.

As the data is transmitted through the medium 206, it may be susceptible to interference. An example of one kind of interference, which causes individual data bits to be flipped, is depicted in data block 423. In particular, the lightning bolt graphics indicate that two bits that have been flipped in the data block 423, relative to the originally transmitted symbol (i.e., the data is shown in the medium 206 as "11001111," rather than the originally transmitted "00001111"). Because of the correlation process that is used to recover the underlying user data, and the process gain that is advantageously employed in the correlation process, the interface may enable the receiver 208 to still recover the underlying data from the user data stream 203. Other systems may tolerate even more interference than what is depicted in FIG. 4.

At the receiver 208, a receive circuit 222 receives various signals, including the data blocks 421, 422, 423 and 424. In some implementations, the receive circuit 222 is synchronized with the transmit circuit 219, such that the receive circuit can identify the start and end of each of the data blocks 421, 422, 423, and 424. Various methods of synchronizing the receiver 208 and transmitter 202 are possible, and these methods are not described in any detail herein; rather, for purposes of this description, it is assumed that synchronization has been established, such that the correlators 225A-225D can subsequently compare each received data block 421, 422, 423 and 424 to each symbol that may have been transmitted by the transmitter 202.

To decode received signals, such as the data blocks 421, 422, 423 and 424, some implementations employ a correlator for each possible symbol to which received data can correspond. In the example of FIG. 4, any one of four possible symbols—$Symbol_{00}$, $Symbol_{01}$, $Symbol_{10}$ and $Symbol_{11}$—are transmitted by the transmitter 202 and received (possibly in corrupted form) by the receiver 208; accordingly, the receiver can employ four correlators 225A-D—one for each of the four possible symbols.

In some implementations, each correlator operates in parallel with the other correlators. That is, once a data block is fully received, the data block can be compared concurrently (or nearly concurrently) to each of the possible symbols. Based on the comparison (e.g., based on an output of each correlator, as described in one implementation with reference to FIG. 5), a symbol selector 226 can cause appropriate decoded data to be provided, based on each received symbol. In the example of FIG. 4, the symbol selector 226 may control a multiplexer 227 that selects appropriate data based on the decoded symbol and outputs the selected data into an output stream 235. For example, upon receipt of the data block 423, the receiver 208 may determine that $Symbol_{01}$ was transmitted and may accordingly output "01."

Figure 5:
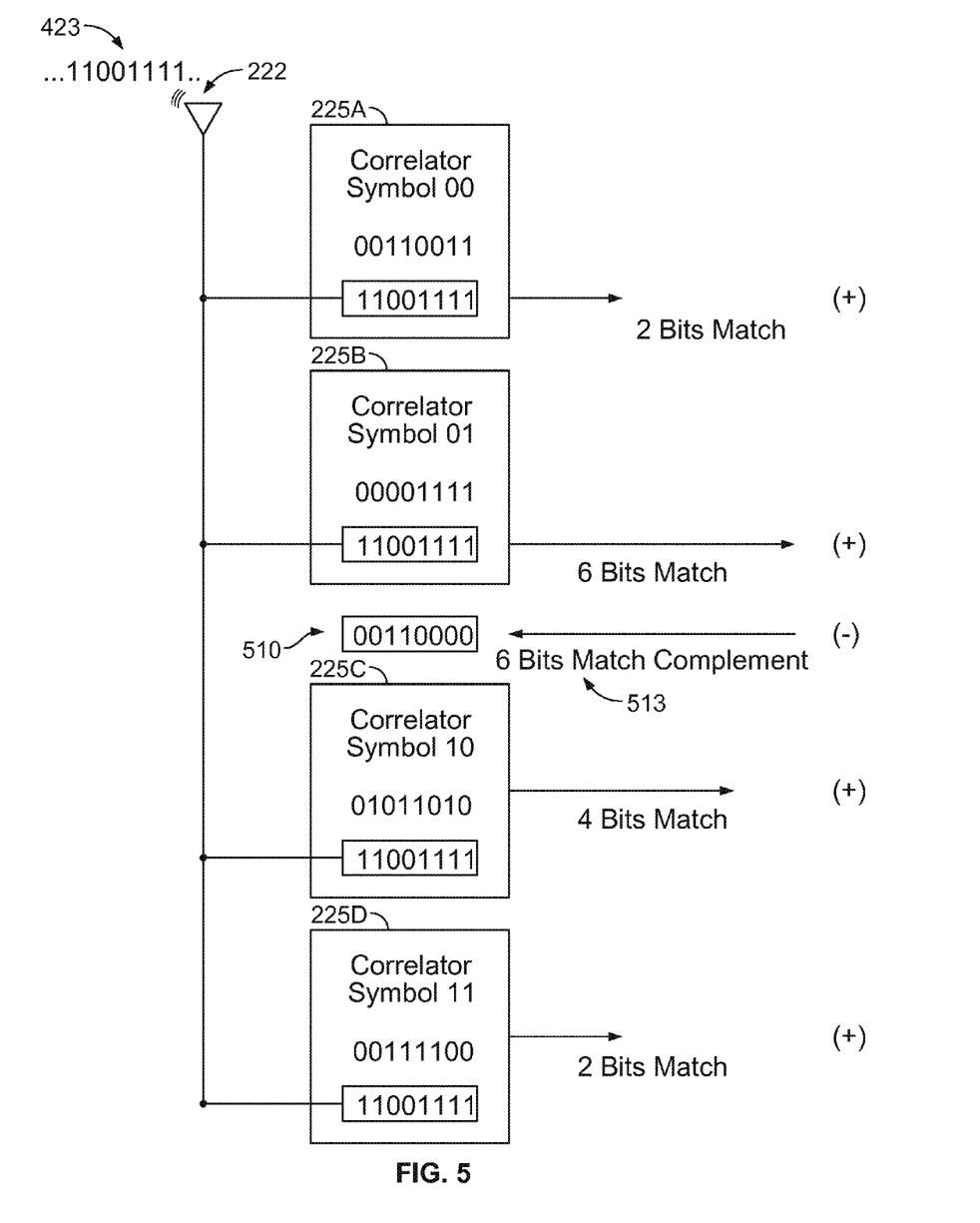
FIG. 5 illustrates an example method of correlating a received block of data to a symbol that may correspond to the data.

FIG. 5 provides a pictorial representation of one example method of correlating a received block of data to possible symbols that may correspond to the received block of data. The reader will appreciate that this description represents a conceptual simplification to graphically illustrate one of many possible mathematical and algorithmic methods of correlating two different signals. Any appropriate correlation method can be employed. For example, some implementations can employ a Hadamard transform, fast Hadamard transform, or other suitable algorithm to correlate received data to a corresponding symbol.

As depicted in the example of FIG. 5, incoming data (e.g., the data block 423 ("11001111"), which was described above as being subjected to interference) is received by the receive circuit 222. The incoming data can be provided to each correlator as shown, and each correlator can compare the incoming data to a different symbol. As shown in this example, correlator 225A compares the incoming data to $Symbol_{00}$ ("00110011"); correlator 225B compares the incoming data to $Symbol_{01}$, ("11001111"); and so on. In one implementation, each correlator 225A-D may determine how many bits of the incoming data match corresponding bits in the possible symbol (e.g., the correlator may determine a magnitude of the correlation); in other implementations, a more complex correlation process is performed. For purposes of illustration, a simple number-of-matching-bits-comparison is depicted (e.g., a magnitude). In this illustration, the six bits of incoming data match corresponding bits in Symbol$_{01}$, while only four or two bits of the incoming data match any of the other symbols.

In some implementations, a sign for the correlation can also be employed to encode and decode data. For purposes of illustration, sign is depicted by the (+) and (−) indicators next to the output of each correlator. Some transmitters can send a single symbol or its complement; on the receiver end, the receiver can employ one or more correlators and decode the data based on the sign of the output(s)—a positive correlation with a particular symbol can indicate one data value, and a negative correlation with the same symbol can indicate a second data value; magnitude can be employed as described above to distinguish between multiple possible symbols, or as a way of determining whether there is a sufficient match with one particular symbol.

In implementations that employ multiple correlators at the receiver, encoding information based on sign can increase the communication bandwidth. For example, FIG. 5 depicts a system in which two bits of information can be effectively communicated (i.e., effectively, two bits decode one of the four symbols—Symbol$_{00}$, Symbol$_{01}$, Symbol$_{10}$ and Symbol$_{11}$). By employing sign, an additional bit of information can be encoded (i.e., three bits effectively decode one of eight "symbols"—(+)Symbol$_{00}$, (−) Symbol$_{00}$, (+)Symbol$_{01}$, (−) Symbol$_{01}$, (+)Symbol$_{10}$, (−) Symbol$_{10}$, (+)Symbol$_{11}$, and (−)Symbol$_{11}$, where (+) represents the symbol itself and (−) represents the symbol's complement (e.g., one's complement)).

In systems that employ correlation sign, the transmitter can be configured accordingly. That is, a symbol's complement (e.g., one's complement) can also be associated with a particular data value and transmitted when that data value is received. For purposes of illustration, the one's complement 510 of the received data 423 is depicted, along with a correlation value 513 of similar absolute magnitude but opposite sign for Symbol$_{10}$.

Output corresponding to the number of matching bits (or based on some other value in a system employing more complex correlators) can be provided to the symbol selector 227 (see FIGS. 2 and 4), and based on a comparison of outputs of each correlator, the strongest match can be determined (e.g., as a means of predicting which symbol was correlated to the incoming data, at the transmitter 202, before the data may have been corrupted in the medium 206).

As the above example illustrates, adding process gain to a data stream 203 can facilitate recovery of data, even after the data is transmitted through a noisy medium 206. By encoding the data 203 as one of four possible symbols (e.g., using a shuffled Hadamard function), sending the symbols through the medium 206, and correlating data received at the receiver 208 to each of the possible symbols, data may be accurately recovered—even if individual bits of transmitted symbols are corrupted in the medium. Thus, in the above example, data block 423 is accurately correlated to Symbol$_{01}$, even though two bits (25% of the bits in the symbol) were flipped during transmission through the medium. The reader will appreciate that the concepts of this example can be readily extended to much longer symbols. For example, symbols having 128 bits may accurately convey data through a noisier medium, in which more than 25% of the bits are corrupted; symbols having even more bits (e.g., 1K, 2K, 8K bits, etc.) may convey data through even noisier media.

A number of implementations have been described. Nevertheless, it will be understood that various modifications may be made. For example, various forms of the flows shown above may be used, with steps re-ordered, added, or removed. Accordingly, other embodiments are within the scope of the following claims.

What is claimed is:

1. A method comprising:
   receiving, at an electronic transmitter device, for communication to an electronic receiver device, a first data value corresponding to one of a plurality of predetermined data values;
   identifying, from a matrix of data bits in a form of a $2^N \times 2^N$ Hadamard matrix whose rows have been randomly or pseudo-randomly shuffled, a column of data bits that is associated with the first data value;
   generating the identified column of data bits based on a proper subset of the columns of the matrix of data bits, each of the columns in the proper subset having a power-of-two column index in the matrix of data bits, the proper subset comprising two or more columns of the matrix of data bits, the proper subset not comprising the identified column of data bits; and
   transmitting to the electronic receiver device, in place of the first data value, the identified column of data bits.

2. The method of claim 1, further comprising:
   receiving data at the electronic receiver;
   correlating the received data to the identified column of data bits; and
   providing the first data value for further processing by the electronic receiver.

3. The method of claim 2, wherein correlating the received data to the identified column of data bits comprises:
   calculating a correlation between the received data and each column in the matrix of data bits to which is associated one of the predetermined data values; and
   determining that the received data is most strongly correlated to the identified column of data bits.

4. The method of claim 3, wherein calculating comprises calculating a sign of the correlation, and determining comprises determining based on the calculated sign.

5. The method of claim 2, wherein correlating the received data to the identified column of data bits comprises calculating a Hadamard transform or fast Hadamard transform.

6. The method of claim 1, further comprising associating the first data value to the column of data bits in a manner that the first data value can be determined by the electronic receiver, from the transmitted column of data bits, in discrimination to other data transmitted by the electronic transmitter device.

7. The method of claim 1, wherein generating the identified column of data bits comprises applying a logical function to the two or more columns of bits from the matrix of data bits.

8. The method of claim 7, wherein applying the logical function comprises applying, bit-wise, an exclusive-OR function to the two or more columns.

9. The method of claim 7, wherein generating the identified column of data bits comprises generating the m$^{th}$ column of the matrix of data bits, and applying the logical function comprises applying, bit-wise, an exclusive-OR function to each power-of-two column in the matrix of bits whose m$^{th}$ row has a value equal to a first predetermined value.

10. The method of claim 7, further comprising storing in a memory device included in each of the electronic transmitter device and the electronic receiver device, a $2^N \times N$ matrix corresponding to columns of the matrix of data bits having power-of-two indices, wherein all of the columns of the matrix of data bits stored by the memory device are columns having power-of-two column indices in the matrix of data bits.

11. The method of claim 10, wherein storing the $2^N \times N$ matrix corresponding to columns of the matrix of data bits having power-of-two indices comprises storing a $2^N \times N$ matrix that includes only columns from the matrix of data bits having power-of-two indices in the matrix of data bits, the stored columns having already been randomly or pseudo-randomly shuffled.

12. The method of claim 1, wherein transmitting the identified column of data bits comprises transmitting, in order and one bit at a time, each bit contained in the identified column.

13. The method of claim 1, wherein each of the predetermined data values has a fixed number of one or more data bits.

14. The method of claim 1, wherein generating the identified column of data bits based on a proper subset of the columns of the matrix of data bits comprises:
without using any columns of the matrix of data bits that do not have power-of-two columns, generating the identified column of data bits based on a proper subset of the columns of the matrix of data bits that includes only columns having power-of-two column indices.

15. The method of claim 1, wherein generating the identified column of data bits based on a proper subset of the columns of the matrix of data bits comprises:
generating a particular column from the matrix of data bits that does not have a power-of-two column index, the proper subset comprising (i) a first column of data bits that is already shuffled relative to the corresponding column in a standard Hadamard matrix, the first column of data bits having a first power-of-two column index in the matrix of data bits, and (ii) a second column of data bits that is already shuffled relative to the corresponding column in a standard Hadamard matrix, the second column of data bits having a second power-of-two column index different from the first power-of-two column index.

16. The method of claim 1, generating the identified column of data bits based on a proper subset of the columns of the matrix of data bits comprises:
identifying a first column index for a particular column of the matrix of data bits to be generated;
selecting, from among the columns of data bits that have power-of-two column indices in the matrix of data bits, each column of data bits that has a particular predetermined value in a row having a row index equal to the first column index; and
applying, bit-wise, an exclusive-OR function to each of the selected columns of data bits.

17. A method comprising:
receiving, at an electronic transmitter device, for communication to an electronic receiver device, a first data value corresponding to one of a plurality of predetermined data values;
identifying, from a matrix of data bits in a form of a $2^N \times 2^N$ Hadamard matrix whose rows have been randomly or pseudo-randomly shuffled, an $m^{th}$ column of data bits that is associated with the first data value;
generating the $m^{th}$ column of bits, including applying, bitwise, an exclusive-OR function to two or more power-of-two columns from the matrix of bits whose $m^{th}$ row has a value equal to a first predetermined value; and
transmitting to the electronic receiver device, in place of the first data value, the dynamically generated $m^{th}$ column of data bits.

18. The method of claim 17, further comprising storing the $2^N \times 2^N$ Hadamard matrix of data bits in a compressed $2^N \times N$ matrix in which only columns of the matrix of data bits having power-of-two column indices are stored in the electronic transmitter device.

19. The method of claim 18, wherein generating the $m^{th}$ column of bits comprises determining one or more columns in the compressed $2^N \times N$ matrix whose $m^{th}$ row has a value equal to the first value, and applying, bitwise, an exclusive-OR function to the one or more columns.

20. The method of claim 17, wherein generating the $m^{th}$ column of bits, including applying, bitwise, an exclusive-OR function to two or more power-of-two columns from the matrix of bits whose $m^{th}$ row has a value equal to a first predetermined value comprises generating the $m^{th}$ column of bits by applying, bitwise, the exclusive-OR function to a set of operands that includes only power-of-two columns from the matrix of bits whose $m^{th}$ row has a value equal to a first predetermined value.

21. A system comprising:
an electronic receiver; and
an electronic transmitter that receives for communication to the electronic receiver a first data value corresponding to one of a plurality of predetermined data values;
wherein the electronic transmitter:
identifies, from a matrix of data bits in a form of a $2^N \times 2^N$ Hadamard matrix whose rows have been randomly or pseudo-randomly shuffled, a column of data bits that is associated with the first data value,
generates the identified column of data bits based on a proper subset of the columns of the matrix, each of the columns in the proper subset having a power-of-two column index in the matrix of data bits, the proper subset comprising two or more columns of the matrix, the proper subset not comprising the identified column of data bits, and
transmits to the electronic receiver device, in place of the first data value, the identified column of data bits; and
wherein the electronic receiver receives data, correlates the received data to the identified column of data bits, and provides to circuitry within the electronic receiver the first data value for further processing.

22. The system of claim 21, wherein the electronic transmitter comprises a memory device that stores the $2^N \times 2^N$ Hadamard matrix of data bits in a compressed $2^N \times N$ matrix in which only columns of the matrix of data bits having power-of-two column indices are stored.

23. The system of claim 21, wherein:
the identified column of data bits comprises the $m^{th}$ column of the matrix of data bits; and
the electronic transmitter further comprises circuitry for generating the $m^{th}$ column from the compressed $2^N \times N$ matrix by applying, bitwise, an exclusive-OR function to one or more columns in the compressed $2^N \times N$ matrix whose $m^{th}$ row has a first value.

24. The system of claim 21, wherein the electronic receiver comprises a plurality of correlators that calculate correlations between the received data and each of a corresponding plurality of columns of the matrix of data bits to which data values in the plurality of predetermined data values are associated.

25. The system of claim 24, wherein the electronic receiver further comprises circuitry that (a) determines which of the corresponding columns from the matrix of data bits has the strongest calculated correlation to the received data and (b) outputs a data value from the plurality of predetermined data values that is associated with the determined corresponding column.

26. A system comprising:

an electronic receiver; and an electronic transmitter that receives for communication to the electronic receiver a first data value corresponding to one of a plurality of predetermined data values;

wherein the transmitter identifies, from a matrix of data bits having a form of a $2^N \times 2^N$ Hadamard matrix whose rows have been randomly or pseudo-randomly shuffled, a column of data bits that is associated with one of the plurality of predetermined data values, the identified column of data bits being an $m^{th}$ column of the $2^N \times 2^N$ Hadamard matrix, wherein the transmitter generates the $m^{th}$ column by applying, bitwise, an exclusive-OR function to two or more input columns from the matrix of data bits, each of the two or more input columns having (i) a power-of-two column index in the matrix of bits and (ii) a value in the $m^{th}$ row that is equal to a first predetermined value; and wherein the transmitter transmits to the electronic receiver device, in place of and based on the first data value, the identified column of data bits or a complement of the identified column of data bits; and wherein the electronic receiver receives data, correlates the received data to the identified column of data bits or the complement, and provides to circuitry within the electronic receiver the first data value for further processing.

\* \* \* \* \*